March 28, 1967 A. S. YEISER 3,311,279

RECORDING MEDIA

Filed April 24, 1963 2 Sheets-Sheet 1

INVENTOR.
ANDREW S. YEISER
BY Allen M. Sutton
ATTORNEY

ANDREW S. YEISER
INVENTOR.

BY Allen M. Sutton

ATTORNEY

United States Patent Office 3,311,279
Patented Mar. 28, 1967

3,311,279
RECORDING MEDIA

Andrew S. Yeiser, Woodland Hills, Calif., assignor, by mesne assignments, to The Bunker-Ramo Corporation, Stamford, Conn., a corporation of Delaware
Filed Apr. 24, 1963, Ser. No. 275,460
23 Claims. (Cl. 226—118)

The present application is a continuation-in-part of copending application Ser. No. 246,809, filed Dec. 24, 1962, and now abandoned, by Andrew S. Yeiser and assigned to the same assignee as the present invention.

This invention relates generally to fan-folded tape suitable for use in digital apparatus, and more particularly to an improved form of fan-folded tape comprised at least in part of a material having limited elastic qualities and of such configuration as to cause those elastic qualities to aid in refolding the tape into fan form.

In many applications, including digital computers, various types of information storage media can be utilized. For example, digital information can be magnetically stored on tapes, drums, discs, cores, and several other devices. Alternatively, digital information can be electrically stored in flip-flops, tunnel diodes, cryotrons, and other devices. Additionally, electromechanical systems can be employed to store digital information, and such systems can make use of punched tapes, punched cards, and other devices which can be read either by utilizing electromechanical switches adapted to close in response to holes punched in the tape or card, or by utilizing a light source capable of casting light through punched holes in the tape or card to some light-sensitive means.

Each of these storage media is particularly adapted for a special use. For example, magnetic cores are generally used where rapid access to information is a significant factor. On the other hand, where the slower access can be tolerated and where a low cost, high capacity storage media is desired, magnetic tape is utilized. Magnetic drums represent somewhat of a compromise between the rapid access offered by cores and the low cost associated with magnetic tape.

Punched card and tape apparatus find significant utility in devices used with digital computer apparatus for input and output purposes. Where punched or perforatable tape is utilized, two optional modes of tape transportation are available to the user. In one mode, the punched taped or raw unpunched taped can be transported between a first feed reel and a second take-up reel past some type of read or punch apparatus. In this mode, if it is desired to access information from a portion of the tape which has already passed the read apparatus, it is necessary to reverse the direction of tape movement so as to rewind that portion of the tape from the take-up reel back onto the feed reel, and then again reverse the direction of tape movement to move that portion in a forward direction past the read apparatus. In the second mode, a continuous or closed loop tape is used which is adapted to continually move past the read or punch apparatus, thereby eliminating any necessity of rewinding, inasmuch as information moved past the read apparatus will again move into position for reading one cycle later. It should be apparent that the continuous or closed loop tape operation is similar to the operation of a magnetic drum or disc in that information will be moved past the read apparatus once each cycle of the tape loop.

In order to permit most efficient storage of the tape, closed loop tapes may be folded in a fan-folded manner. A conventional fan-folded tape comprises flat tape sections having transverse creases there in generally at equal intervals along the tape length, the creases being formed by tightly folding equal length tape sections in alternate directions back upon previously folded tape sections to thereby establish a compact stack. In this manner, a 100 foot tape, for example, can be folded into 100 tape sections, each being one foot in length. The folded stack can then be stored in a container having a volume equal to the product of the width of the tape, the length of the tape sections (one foot), and the height of the stack (approximately 100 times the thickness of the tape). During use by a typical read or punch apparatus, such tape is pulled by the read or punch apparatus from the bottom of the stack through a read or punch section of the apparatus and thereafter returned to the top of the stack. During this process the tape is, of course, unfolded, temporarily flattened, and then refolded.

Paper has by far been the most prevalently used tape material for fan-folded tape applications. This preference for paper is directly attributable to several of its more significant characteristics: notably its low cost and its ability to take a permanent crease. This latter characteristic arises by virtue of the fibrous nature of paper and is significant because the apparatus with which the tape cooperates flattens the tape out in the process of reading or punching it, and the presence of permanent creases at and along desired lines of fold permits the tape to be easily refolded in a desired fan-folded fashion. By tightly folding sections of paper, the tensile strength of fibers on the outside surface of the fold is exceeded, thereby rupturing numerous fibers at points along the transverse line defined by the fold and producing a permanent crease. Inasmuch as the body of material along the crease and line of fold has lowered rigidity and elasticity, the tape has a tendency to refold about this line when let out onto a surface from above. Although this tendency generally causes the paper tape to refold along such desired lines of fold, because of its over-all relatively poor rigidity, undesired folding of the tape sometimes occurs at positions within sections of tape between such desired lines of fold.

In the light of this undesirable characteristic of conventional fan-folded paper tape, it is an object of this invention to provide an improved fan-folded tape having a configuration particularly adapted to aid in refolding itself along desired lines of fold and to deter the inadvertent folding of the tape and the inadvertent formation of creases at positions intermediate said desired lines of fold.

In addition to the above-noted tendency of paper fan-folded tape to undesirably fold or crease at positions intermediate desired lines of fold, paper tape is known to have other undesirable characteristics. Among the more significant of these are its extreme sensitivity to humidity, its generally non-uniform opacity caused in part by the presence of pinholes which cause incorrect information to be read where light-sensitive reading apparatus is employed, its relatively low tensile strength, and its attendant general inability to stand up under continued use without tearing or breaking. In this latter respect, particular trouble is encountered when holes are punched in close proximity to or in fact on a desired line of fold at which a permanent crease has been previously formed. This is due to the fact that the tensile strength of the tape is already reduced in the area of the crease by virtue of the fibers thereof having been ruptured in forming the crease, as mentioned above. Holes punched in the tape in this area reduce the effective tape cross-section, thereby further reducing the longitudinal tensile strength of the tape and rendering the tape more vulnerable to undesirable tearing or breaking.

It is known that materials comprising non-fibrous substances such as a plastic or a metal have been successfully used in the manufacture of tapes useful as data recording media. Such tapes do not suffer from the above-noted disadvantages to the same extent as tapes made of paper and hence offer real advantages over paper tape in applications where high moisture resistance, uniform opacity, high tensile strength, and high resistance to tearing are required. However, past attempts to fan-fold tapes made of such materials have been unsuccessful because the forces applied to the tapes by conventional read or punch apparatus in unfolding and flattening the tapes for passage through a read or punch section of the apparatus generally produces stresses in the tape material which exceed the yield strain or elastic limit of the tape material, specifically along the preformed creases established at desired lines of fold. This, in effect, produces a permanent set in the tape material along such creases of such character as to oppose or prevent the subsequent fan-folding of the tape when it is returned to the top of the fan-folded tape stack as discussed above. Such refolding difficulties are, of course, also experienced with so-called composition paper tapes which include plastics, binders, or other elastic nonfibrous material in sufficient proportions that their elastic properties prevail over the fibrous properties of paper tape discussed above.

In the light of this, it is an additional object of this invention to provide an improved fan-folded tape having a configuration such that it can be flattened and yet still retain its tendency to refold along established creases coincident with desired lines of fold.

Both of the above objectives are at once realized in the practice of the present invention by taking advantage of the unique application of apparently heretofore overlooked structural and/or geometrical principles peculiarly applicable to thin elongated bodies of compliant material in ribbon or tape form, especially where such tape or ribbon is intended for use as a fan-folded data storage medium. First, advantage is taken of the principle that the longitudinal rigidity of a section of a thin elongated body or tape made of compliant material having limited elasticity can be increased by forming or otherwise imparting to the tape a permanent set such that the tape laterally conforms to a nonplanar surface. Where, for example, such surface is circularly, parabolically, or elliptically cylindrical in form, such tape will, in the absence of externally applied forces, assume a cupped configuration across its lateral dimension. Secondly, advantage is taken of the discovery that a tape of elastic material may be so configured that when it is folded back upon itself and tightly creased by pressure, heat or otherwise along the line of fold, a portion of the energy expended in subsequently unfolding the tape will be stored by the elastic deformation of the tape material to create torque forces about the line of fold which aid in later refolding the tape back upon itself. More specifically, such action is realized by again imparting to the tape a permanent set of such character that, at least in those areas immediately adjacent the line of fold and on both sides thereof, the tape laterally conforms to nonplanar surfaces, which in turn are of such form and configuration as to be to a large extent geometrically superposable and so oriented with respect to each other that such areas of the tape will lie in substantial superposition and congruency when the tape is folded back upon itself along the line of fold. Thus, when the tape is unfolded and made tangent to a plane, the superposable, potentially congruent portions of the tape are inverted one with respect to the other and are joined by elastically stressed portions of tape material, then variously subjected to conditions of tension or compression. The permanent set imparted to the tape may be extended to the entire length of each tape section as well as be limited to those areas immediately adjacent the line of fold and on both sides thereof.

It will also be seen that the longitudinal rigidity of a tape conformed as last described will, along the line of fold, be less than at locations adjacent the fold as, for example, in the above-described areas set to conform to nonplanar surfaces. This occurs, in accordance with the principles above discussed, because the crease at the line of fold represents a discontinuity in both adjacent nonplanar surfaces. Apart, therefore, from the elastic stresses that may be set up within the tape material, which in the case of materials having very limited elastic properties may be negligible, the formed tape will, upon being subjected to random external forces, not only have a tendency to fold at the desired line of fold, but to fold in a direction offering the least mechanical resistance, which in turn tends to bring the nonplanar set areas of the tape into congruent superposition.

In accordance with a preferred form of the invention, a stacked fan-folded tape is subjected to an appropriate forming process to set the sections of the tape and, of course, the creases between the sections, to substantially the same nonplanar configuration. As a result, when the tape is unfolded, it will be seen that the tape sections are alternately inverted but are capable of being easily refolded in the desired manner.

In further accordance with the present invention, in one embodiment the tape sections are formed in a cylindrical configuration with the axis of the cylinder extending substantially parallel to the longitudinal axis of the tape.

Advantage is further taken of the limited elastic characteristics of materials used in ribbon or tape form, especially where such tape or ribbon is intended for use as a fan-folded data storage medium. In order to reduce the force necessary to pull the tape through a conventional read or punch apparatus in the way heretofore described, the tape sections are formed in a compound cylindrical configuration with the axis of the second cylinder extending transversely to the longitudinal axes of the tape sections. By so setting the tape sections, the fan-folded tape may be pulled by a tape punch or reader without the tape sections being compressed to the rupture point, and the easy refolding of the tape sections after passing through a read or punch apparatus is ensured. Whereas longitudinally unfolding and then both longitudinally and transversely flattening out a tape about a line of fold generally will exceed the elastic limit or yield strain of the material at and along the crease itself so as to effectively eliminate the tendency of the tape to refold about the crease, flattening out of the tape formed to a cylindrical configuration with the axis of the cylinder being substantially parallel to the longitudinal axis of the tape and further formed to a cylindrical configuration with the axis of the latter cylinder being transversely aligned with the longitudinal axis of the tape, does not for most cylindrical configurations exceed the yield strain of most plastic and metal tapes. Accordingly, the tendency of the tape to reform, attributable to its elastic qualities, to its set configuration persists and, so long as it does, the tendency of the tape to refold about the desired lines of fold will also persist.

In the preferred embodiment of the invention, the tape sections are preferably formed to circular cylindrical configuration, with the axis of one of the cylinders being perpendicular to the longitudinal axis of the tape, and the axis of the other cylinder being parallel to the longitudinal axis of the tape. It has been found that for thinner tapes, a setting surface similar to a corrugated configuration is preferred, wherein the axes of the alternating ridges and grooves are parallel to the longitudinal direction of the fan-folded tape. However, it is recognized that many different nonplanar configurations may suffice to accomplish the intended purpose, i.e. to aid the tape in refolding itself about desired lines of fold. That different nonplanar configurations will suffice can be seen from the fact that the line of fold, constituting an intersection between two adjacent tape sections or surfaces, tends to lie in both surfaces and that it is most nearly able to so lie when the two nonplanar surfaces are superposed. Being nonplanar, and connected to each other at one end, the two sections would not be capable of relative pivotal movement about that end where they rigid. However, because of the elastic qualities of the tape in the tape areas immediately adjacent the line of fold, internal elastic forces set up when the sections are pivoted relative to one another, as would occur when unfolding the tape, act in a direction to restore the sections to a superposed relationship.

It is pointed out that the principles of the invention are applicable to tapes formed of any material, but are particularly useful where the material has sufficient elasticity in the areas around the line of fold to store enough energy to lend substantial aid in the refolding of the tape, i.e., sufficient elasticity to reform to its nonplanar shape after being flattened out. A few of the several commercially available tapes which can be used in accordance with the invention are pure plastic such as Mylar, a trademark of E. I. du Pont de Nemours and Co., paper or aluminum foil sandwiched between plastic layers, and plastic sandwiched between paper layers. Additionally, tapes could be formed of special papers or metal films having the requisite elasticity. In addition to having sufficient elasticity, it is necessary that the tape be sufficiently rigid between lines of fold to avoid inadvertent creases being formed due to the weight of the tape itself. Although the tape has to this point been described as being nonplanar along the full length of each tape section, it is recognized that it may under certain circumstances be desirable to restrict the forming of the tape to nonplanar surfaces, with respect to both its longitudinal and transverse axes, to just those areas immediately adjacent the lines of fold.

Mylar is a polyester film and one of a class of thermoformable plastics which can be given a permanent set by subjecting it to suitable pressure and heat. Several embodiments of apparatus capable of forming nonplanar tape from planar tape by the use of pressure and heat will be described as the specification proceeds. It is contemplated, however, that nonplanar tape can be formed in accordance with the invention by several other techniques.

In addition to thermoformable plastics which can be used in accordance with the invention, several thermoplastic materials can likewise be used. For example, polypropylene, provided as a film, can be used. Moreover, it is possible to form certain metal films to a nonplanar shape which have sufficient elasticity for use in accordance with the invention.

Although the utility of fan-folded tape as a continuous loop in digital punch apparatus has to this point been emphasized, it is pointed out that it may be highly desirable under certain conditions to use fan-folded tape even where continuous loops are not desirable. For example, in the process of initially punching blank tape, the tape should be of a finite length rather than continuous. Regardless, however, fan-folded tape formed in accordance with the invention can be more easily refolded than heretofore known tapes. In addition to punched tape, magnetic tape suitable for magnetic recording can be fan-folded in accordance with the invention wherever compact tape stacking can advantageously be employed.

Additional objects and advantages which will subsequently become apparent reside in the structural details and mode of operation as more fuly hereinafter described and claimed, further reference being made to the accompanying drawing forming a part hereof, wherein like identifying numerals refer to like parts throughout the several figures and in which:

Figure 1:
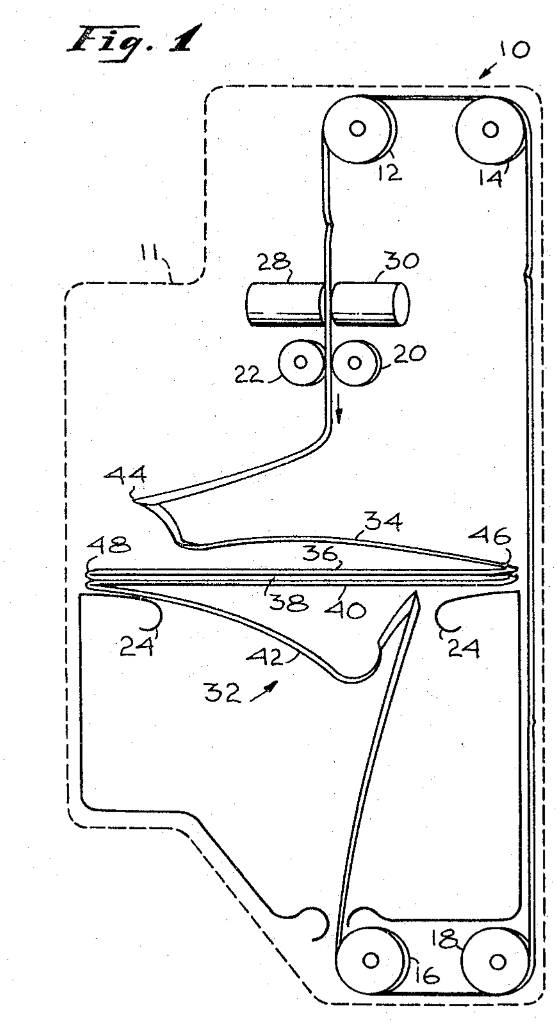
FIGURE 1 is a diagrammatic perspective view of a punched tape read apparatus showing the manner in which tape constructed in accordance with one of the embodiments of the invention may be handled.

With continuing reference to the drawing, initial attention is called to FIG. 1, which illustrates a punched tape read apparatus 10 typical of the type of equipment with which the fan-folded tape taught herein can be utilized. The read apparatus 10 includes a mounting wall 11 on which are rotatably mounted guide rollers 12, 14, 16, and 18, a drive capstan 20, and a pinch roller 22. Additionally, a pair of spaced tape supports 24 are secured to the wall 11 above the rollers 16 and 18. Read means including a light source 28 and light-sensitive means 30 are secured to the wall 11 immediately above the drive capstan 20 and pinch roller 22.

Tape 32, constructed in accordance with the invention, is adapted to be utilized with the apparatus 10 such that a first portion of the tape is stacked on supports 24 and a second portion is passed around the rollers 12, 14, 16 and 18 and between the light source 28 and light-sensitive means 30 and between the drive capstan 20 and pinch roller 22. The drive capstan 20 and pinch roller 22 engage the tape 32 so that rotation of the drive capstan by drive means (not shown) pulls the tape 32 around the rollers in the direction indicated by the arrows.

The tape 32 is fan-folded, i.e., it essentially comprises a tape having transverse creases or lines of fold therein generally at equal intervals along the tape length, the direction of the creases or lines of fold being alternated so as to permit the equal length tape sections defined therebetween to be folded one on top of the other to form a neat stack of connected, alternately inverted sections. The tape 32 is formed of a material having limited elastic qualities which tends to retain a set nonplanar shape. As previously pointed out, in addition to paper, several commercially available nonfibrous tapes, such as those formed of materials including plastic and metal, satisfy these requirements. All nonfibrous tapes having these elastic qualities have heretofore been unavailable for use in fan-folded fashion due to the fact that tight creases therein were effectively removed when two adjacent tape sections were opened up, that is, pivoted with respect to each other out of a superposed relationship into a substantially longitudinally aligned relationship. This is demonstrated in FIGS. 2A and 2B which respectively illustrate the conventional folding action of a fibrous tape 15 such as paper and a nonfibrous tape 17 such as plastic, each having punched holes 26 therein. When tape 15 is tightly folded, the tensile strength of fibers on the outer surface 19 of the tape is exceeded, thereby causing a rupture 21. On the other hand, when tape 17 is similarly folded, the outer surface 25 thereof stretches, and the elastic forces set up within the tape tend to unfold the tape. By subjecting the tape to suitable heat and pressure, however, the tape can be set in the folded condition illustrated so that the elastic forces will then act to resist unfolding. The elasticity of a plastic tape of a material such as Mylar is on the order of 100%; i.e., it can be stretched 100% without permanently deforming it. Inasmuch as the lengths of the outer and inner surfaces 23 and 25 between lines 27 and 29 would have to be respectively compressed and stretched to become equal if the tape were to be unfolded, and since this would require a greater than 100% change where the fold is tight, the yield strain or elastic limit of the tape would be exceeded, thereby effectively removing the crease and eliminating the tendency of the tape to fold around it. In other words, the tape would be given a new permanent set.

The fact that the tape is unfolded in usage by the apparatus 10 can be noted from a consideration of FIG. 1. Tape 32 consists of a series of tape sections, sections 34, 36, 38, 40, and 42 being ascertainable in the stack supported on tape supports 24. The direction of creases or lines of fold formed between adjacent tape sections is alternated such that, for example, crease 44 formed on one end of section 34 extends in a direction opposite to crease 46 formed on the other end of section 34. Similarly, crease 48 formed on the second end of section 36 extends in a direction opposite to crease 46 formed on the first end of section 36.

When tape 32 is pulled by drive capstan 20 and pinch roller 22 around the various rollers, successive portions of the tape unfold; i.e., formerly superposed sections move into longitudinal alignment. Although this unfolding action does not remove the creases from paper tape where the fibers of the paper are permanently ruptured, as shown in FIG. 2A, it does effectively remove creases from nonfibrous materials as indicated by FIG. 2B inasmuch as the yield strain or elastic limit of the tape material is exceeded.

In accordance with the invention, in order to encourage the tape to refold upon itself about the original creases or lines of fold, and in order to provide greater rigidity therebetween, each of the tape sections is formed or set to a nonplanar cylindrical configuration where a cylindrical configuration is defined as any nonplanar configuration traced by any straight line moving parallel to a fixed straight line. Thus, the tape comprises a series of connected, identically shaped, alternately inverted tape sections.

Figure 3:
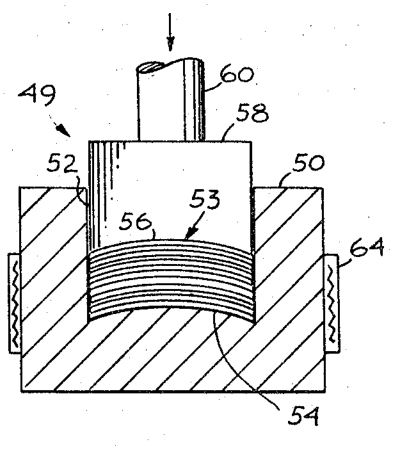
FIG. 3 is a sectional view of one form of apparatus utilized to heat-set plastic fan-folded tape to a nonplanar form.
Figure 2:
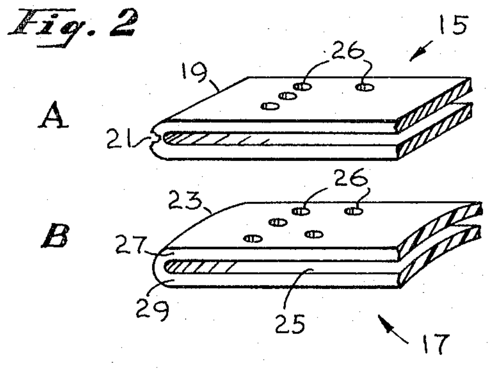
FIGS. 2A and 2B are fragmentary perspective views of a pair of adjacent tape sections shown to respectively illustrate the folding action of a fibrous tape such as paper and a nonfibrous tape such as plastic or metal.

In one embodiment of the invention, as illustrated in FIGS. 2 and 3, the sections of the tape can comprise portions of circular cylindrical surfaces whose axes extend parallel to the longitudinal axis of the tape. These nonplanar surfaces can be formed by initially fan-folding the tape and then setting the entire stack or successive portions thereof to a related nonplanar configuration. Assuming, for example only, that the tape is formed of a plastic material, the apparatus of FIG. 3 can be utilized to set it by application of suitable heat and pressure. Apparatus 49 includes a block 50 having an opening 52 therein for receiving a tape stack 53. A surface 54 on the bottom of the opening 52 comprises a portion of a circular cylindrical surface. Similarly, a bottom surface 56 of a pressure plate 58 comprises a portion of a circular cylindrical surface. A shaft 60 is secured to pressure plate 58 and is adapted to be reciprocally operated by hydraulic means (not shown) to apply considerable pressure to the fan-folded tape stack 53 disposed between surfaces 54 and 56. In addition to applying pressure to the tape stack 53, heat is applied thereto by the utilization of heating coil 64 supported around the block 50. By maintaining the tape under suitable pressure and heat for a sufficient time, depending upon the characteristics of the tape, a relatively permanent set can be imparted to the sections of the tape.

Figure 4:
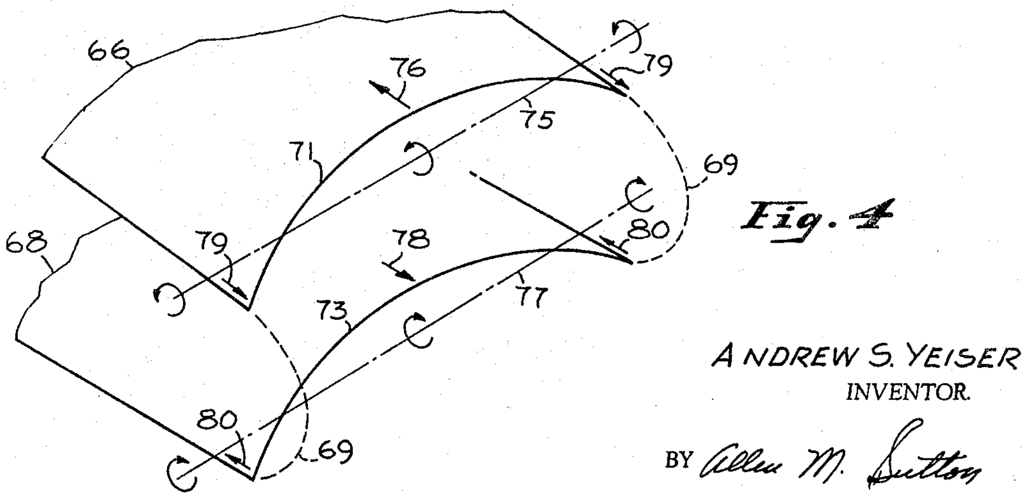
FIG. 4 is a schematic fragmentary perspective view of a pair of adjacent tape sections formed in accordance with the invention showing in detail exemplary elastic forces within the tape tending to refold the sections about the original crease.

FIG. 4 schematically illustrates end portions of a pair of adjacent tape sections 66 and 68. The tape sections 66 and 68 are connected by a small area of tape represented by dotted lines 69 and included between adjacent ends 71 and 73 of sections 66 and 68. The tape area represented by dotted lines 69 constitutes the line of fold or crease between the sections 66 and 68. By heat-setting the sections 66 and 68 in superposed relation, as shown in FIG. 3, subsequent relative pivotal movement of the sections 66 and 68 about the line of fold or crease will set up elastic restoring forces within the tape, which act in opposition to applied external forces, as illustrated by the arrows. More particularly, when section 66 is subjected to external forces, as encountered in apparatus 10, acting to pivot it away in a clockwise direction from section 68, tensile and compressive forces are set up in sections 66 and 68 which create torques around the neutral axes 75 and 77, respectively, the torques tending to restore the sections to a superposed relationship. The neutral axis is considered to be that line passing through points in the tape sections which are in neither tension nor compression. As a consequence, when the external forces are removed, the internal forces will aid in refolding the tape about the desired lines of fold.

More particularly, the external force acting on the free end of section 66 to pivot it clockwise compresses the central portion of section 66 and extends the central portion of section 68, thereby setting up forces therein, as represented by force arrows 76 and 78, which act to oppose the external force. Similarly, the outer edges of section 66 are put in tension, while the outer edges of section 68 are put into compression, thereby setting up forces therein, as represented by force arrows 79 and 80, which also act to oppose the external forces. As a consequence of the forces set up in the tape in the areas immediately adjacent the crease or line of fold, as a result of the relative pivotal movement between sections, the sections have a tendency to refold into superposed relationship inasmuch as the forces in section 66 all act in a direction to pivot section 66 counterclockwise around its neutral axis 75, and the forces in section 68 all act in a direction to pivot section 68 clockwise about its neutral axis 77. It is pointed out that the forces acting to refold the tap exist in the tape areas adjacent the crease or line of fold, and not necessarily in the crease area itself. As a consequence, the invention is also applicable to fibrous material such as paper, where the fibers are ruptured at the crease itself but where elastic qualities still exist in the areas adjacent the crease.

It should be apparent that the internal forces shown in FIG. 4 have been simplified for purposes of illustration. The exact forces that occur can be exceedingly complex and depend upon several factors, including the rigidity of the tape, dimensions of the tape, the degree to which the tape sections are nonplanar, and other factors. Regardless of the exact internal forces that occur, however, they are always set up in directions which tend to oppose the external forces acting to pivot the sections 66 and 68 away from one another. The external forces operative in apparatus 10 to flatten out or unfold the tape, of course, are derived from the force exerted on the tape by drive capstan 20 operating in conjunction with roller 22. That the internal forces will always act in opposition to the external forces attempting to unfold the tape is apparent when it is considered that the crease or line of fold is common to the surfaces of both sections 66 and 68 and tends to lie in both surfaces. Since the surfaces are nonplanar, it will most nearly lie in both surfaces when the surfaces are superposed in the manner in which they are superposed when they were heat-set in the stacked condition shown in FIG. 3.

In the operation of the apparatus 10 of FIG. 1, the tape 32 is pulled by drive capstan 20 and pinch roller 22 past light source 28. As a consequence, successive tape sections are pulled from the bottom of the tape stack between supports 24. The tape 32 is supported on supports 24 with the tape sections concave upwardly to permit easy withdrawal of the lower tape section from between the tape stack and support. Each tape section emerging from between capstan 20 and roller 22 exercises a torque, due to its weight, about the crease moving past the capstan immediately before it. This torque, coupled with the elastic restoring forces set up in the tape, helps the tape to properly refold itself.

Figure 5:
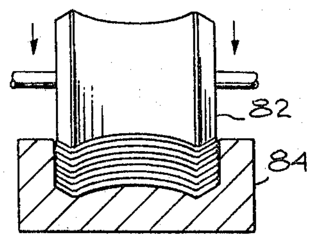
FIG. 5 is a second embodiment of apparatus which can be utilized to heat-set plastic fan-folded tape to a nonplanar form.

Although the nonplanar circular cylindrical tape surface shown in FIGS. 1, 3 and 4 represents one embodiment of the invention, many other nonplanar cylindrical surfaces will function to accomplish the intended purpose, i.e. facilitate the refolding of the tape. FIG. 6A shows another example of a nonplanar cylindrical surface, which will perform in a manner similar to that heretofore disclosed. Although the nonplanar surface of FIG. 6A could be formed in a manner similar to that shown in FIG. 3, an alternative apparatus for setting the tape to the shape of FIG. 6A is shown in FIG. 5. In this apparatus, a planar fan-folded tape stack is positioned between a shaped roller 82 and a shaped surface 84. The roller 82 is adapted to roll reciprocally over the tape stack and apply pressure to selected portions of the tape. In addition to the pressure applied to portions of the tape, the roller 82 can be heated to set the tape in the nonplanar form shown in FIG. 6A.

In another embodiment of the present invention, the nonplanar circular cylindrical surface shown in FIGS. 1, 3 and 4 is replaced by a nonplanar cylindrical surface of a corrugated configuration as shown in FIG. 6B. The tape is permanently set to the corrugated configuration by placing the fan-folded tape in an apparatus similar to the apparatus shown in FIG. 3 wherein circular cylindrical surfaces 54 and 56 are replaced by surfaces having a configuration similar to the one shown in FIG. 6B. The corrugated nonplanar surface has been found to be more desirable especially for fan-folding and permanently setting thin tapes, smaller radii of the peaks and grooves of the corrugated surface being chosen for setting thinner tapes.

Furthermore, the U shaped nonplanar configuration shown in FIG. 6C is considered within the scope of the invention. With the shape of FIG. 6C, however, the forces acting to refold the tape are present only because of the radius of the apex of the U and are thus not as substantial as in other configurations.

The set given to the tape sections should be such as to provide strain in the tape, when flattened, that is substantially no greater than the yield strain of the tape at its surfaces. It has been found that, if the strain provided in the tape is initially slightly greater than the yield strain, after several foldings it will be reduced to approximately the value of the yield strain. Of course, it is possible to provide strains considerably less than the yield strain of the tape, but the refolding facility of the tape will be correspondingly reduced.

The energy storage per unit width of tape is proportional to the strain in the tape when flattened. Therefore, for maximum energy storage, the strain should be at the yield point all across the surface, which means that the surface should have a uniform radius of curvature. If the surface has a circular cylindrical configuration, the angle subtended by the arc of the circle should not exceed a critical value of approximately 180°. If the surface has a corrugated configuration, the angle subtended by the arc of each of the corrugations should not exceed that critical value. In no case, should the projected width of the monplanar surface be less than 50% of its flattened or true width.

Figure 6:
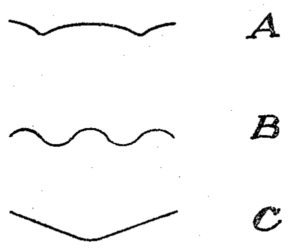
FIGS. 6A, 6B and 6C illustrate three additional nonplanar forms of tape which will function in accordance with the teachings herein.

In still another embodiment of the present invention, the tape sections are set to a permanent nonplanar compound cylindrical configuration having both longitudinal and transverse axes. If both cylindrical configurations are circular, the surface of each tape section forms a portion of a toroid. However, since the cylinders need not be circular, the tape sections are referred to as having compound cylindrical configurations with longitudinal and/or transverse axes. Thus, a longitudinal cross-section of a tape section would show the tape surface as a curved line, such as a portion of a circle, ellipse, hyperbola or the like, and a transverse cross-section would show it as a curved line, such as seen in FIG. 3 or 6. The radius of the curvature in the longitudinal direction is many times that of the transverse curvature (20–40 times). The advantages gained by so permanently setting the tape sections of the fan-folded tape may conveniently be explained by referring to FIG. 7, which is a diagrammatic view of a punched tape apparatus 10′ (similar to that shown in FIG. 1) showing the manner in which the tape constructed in accordance with the present embodiment of the invention may be handled.

Figure 7:
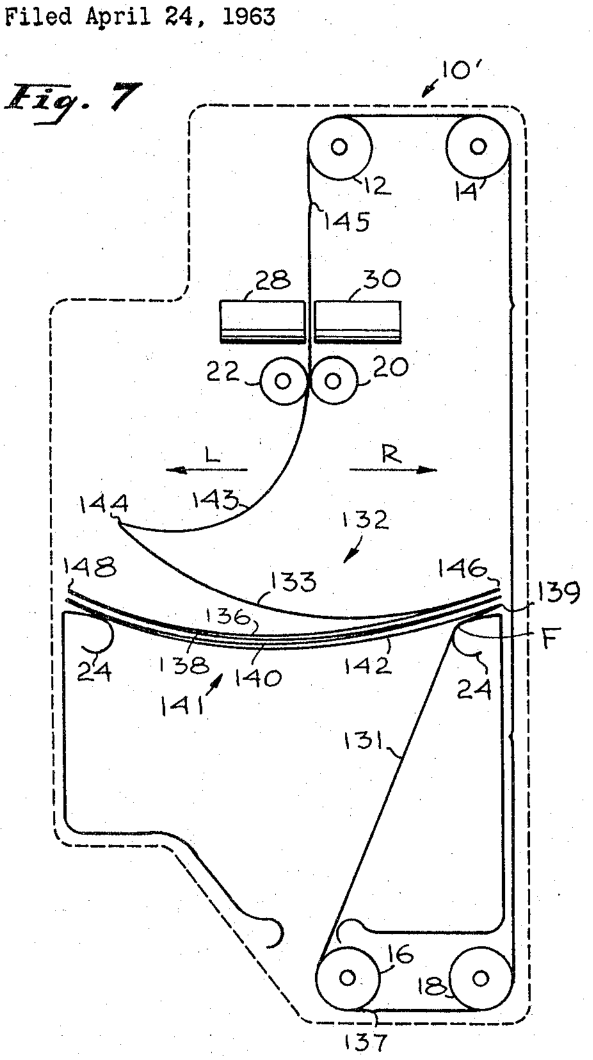
FIG. 7 is a diagrammatic plan view of a punched tape read apparatus showing the manner in which tape constructed in accordance with a second embodiment of the invention may be handled.

In FIG. 7, a tape 132 is shown partially comprising a stack 141 of tape sections 136, 138, 140, 142 supported on tape supports 24. The rest of the tape 132 is shown as it is being pulled around idlers 12, 14, 16 and 18 by capstan 20 and pinch roller 22. Tape section 133, having end creases 144 and 146, is shown after having passed between capstan 20 and pinch roller 22, while tape section 143, having end creases 144 and 145, is shown to have only partially passed through the capstan and pinch roller assembly. When fan-folding a tape in accordance with the teachings of the present invention, it is desirable that creases 145, 144, 146 and 148, after passing through the capstan roller assembly be supported alternately by tape supports 24 so that the creases 148 and 144 are supported on one tape support 24 and the creases 145 and 146 are supported on the other tape support 24. To increase the assurance that the tape will be properly fan-folded in stack form, the tape sections in accordance with the present embodiment of the invention are set to a nonplanar compound cylindrical configuration with both a longitudinal axis and an axis perpendicular to the longitudinal axis of the tape. Thus, as soon as one end of a tape section passes between the capstan 20 and the pinch roller 22, the tape tends to follow a direction which is tangential to its set compound cylindrical configuration so that alternating creases are supported by the desired tape supports 24. In FIG. 7 the compound cylindrical set in tape section 143 causes crease 144 to be directed as indicated by the arrow L, while the crease 145, after passing the capstan 20, will tend to follow a direction indicated by arrow R and finally align itself and be superposed on crease 146.

The strain in the tape due to the cylindrical configuration about is transverse axis, when flattened, may be much less than the yield strain of the tape. In practice, it has been found that strain of 2.5–5.0% of the yield strain will suffice to accomplish the desired result.

Another advantage which is realized by setting the tape section in a nonplanar configuration about an axis perpendicular to the longitudinal axis of the tape lies in the reduction in force that is necessary to pull the tape through the apparatus, and the avoidance of any possible undesired tape deformations at the bottom of the stack of tape sections. Again referring to FIG. 7, as tape 132 is pulled towards idler 16, tape section 131 bounded by creases 137 and 139 has tensile forces exerted thereon which have to overcome frictional forces created at a point designated F. The tensile forces in tape section 131 create reactive compressional forces in the tape section 142 which is the bottom tape section of the stack of tape 141.

Detailed studies have indicated that, before the tape section 142 on the bottom of stack 141 may be pulled from underneath the stack of tape sections, compressional forces of magnitudes and directions sufficient to bend or buckle the tape section must be present therein. Experience has indicated the desirability of each tape section, when subjected to the compressional forces at the bottom of the stack, bending or buckling downwardly and away from the tape sections above it so as not to disturb the stack of tape sections. Such desired results are clearly obtainable when placing the fan-folded tape 132 in the apparatus 10′ as shown in FIG. 7. By placing the tape sections comprising the stack 141 with their nonplanar surface concave upwardly, each tape section, when occupying the bottom position in the stack 141, bends or buckles downwardly and away from the rest of the stack when compressed and pulled towards roller 16 as described hereinbefore, the force necessary to pull the bottom section from underneath the stack being smaller than the force required when the tape sections in the stack are straight, as shown in FIG. 1.

Figure 8:
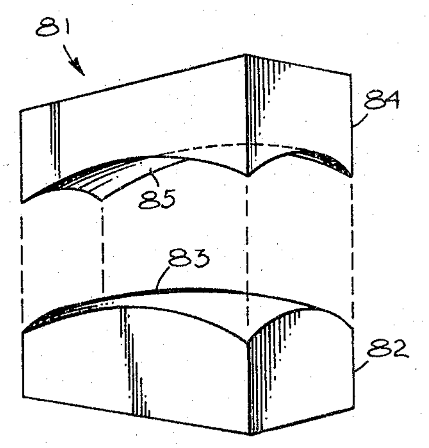
FIG. 8 is a perspective view of a portion of another form of apparatus utilized to set plastic fan-folded tape to nonplanar surfaces.

The tape sections described in the present embodiment of the invention wherein each tape section is set to a nonplanar cylindrical configuration having an axis parallel to the longitudinal axis of the tape and a nonplanar cylindrical configuration having an axis perpendicular to the longitudinal axis of the tape, may be set by utilizing a two-piece apparatus 81, as shown in FIG. 8. Apparatus 81 comprises a block 82 having a rectangular surface 83 which is cylindrically convex about both longitudinal and transverse axes. A block 84 having a rectangular surface 88 complementary in shape to the surface 83 forms the other part of the apparatus 81. The surfaces 83 and 85 are machined or otherwise formed so that when the block 84 is placed on top of block 82, the two surfaces are substantially in mating contact. By placing a stack of tape sections (not shown) on the block 82 and then superposing block 84 on the stack of tape, sufficient pressure, due to the weight of the block 84, is exerted on the tape sections to deform and set each section to conform to the shape of surface 83. The permanency of the set may further be enhanced by subjecting apparatus 81 with the stack of tape therein to a heating process to aid in permanently setting the tape sections to form preselected nonplanar cylindrical surfaces. This might be accomplished by placing a heating coil (not shown) about the apparatus.

From the foregoing, it should be apparent that applicant has herein disclosed a fan-folded tape configuration particularly adapted to facilitate refolding of the tape. This facility for refolding arises by virtue of the setting of the sections of the tape to nonplanar shapes whereby the tape is temporarily deformed in the process of flattening the tape for reading or punching. The energy expended in flattening the tape is partially stored in the tape resulting in the generation of restoring forces which act to refold the tape in a fan-folded configuration, when the external unfolding forces are withdrawn. That any nonplanar cylindrical configuration will suffice to operate to refold the tape has been demonstrated by the fact that the crease or line of fold between adjacent tape sections tend to lie in both sections, and this can most nearly occur when the tape sections are superposed.

It is also pointed out that in certain applications, it may be desired to form the tape sections to a cylindrical configuration about a transverse axis only, and such is without the contemplation of the present invention.

The embodiments of the invention in which an exclusive property or privilege is claimed are defined as follows:

1. An elongated tape defining a series of connected alternately inverted tape sections, each of said sections having a permanently set nonplanar cylindrical configuration.

2. An elongated tape formed of a material having limited elastic qualities and defining a series of connected identically shaped alternately inverted tape sections, each of said sections being of equal length and defining a permanently set nonplanar surface.

3. An elongated tape formed of a material having limited elastic qualities and defining a series of connected alternately inverted tape sections, each of said sections defining a permanently set nonplanar surface.

4. The tape of claim 2 wherein each of said nonplanar surfaces has a circular cylindrical configuration.

5. An elongated tape formed of a material having limited elastic qualities and including a plurality of equally spaced transverse creases alternately extending in opposite directions and defining tape sections therebetween, each of said tape sections having a permanently set nonplanar cylindrical configuration.

6. The tape of claim 5 wherein each of said tape sections is identically shaped and said tape sections are alternately inverted.

7. The tape of claim 5 wherein each of said tape sections has a circular cylindrical configuration.

8. The tape of claim 5 wherein each of said tape sections has a cylindrical corrugated configuration about an axis parallel to a longitudinal axis of said tape.

9. The tape of claim 8 wherein each of said tape sections further has a permanently set nonplanar cylindrical configuration about an axis transverse to said longitudinal axis of said elongated tape.

10. An elongated tape formed of a material having limited elastic qualities and including a plurality of equally spaced transverse creases alternately extending in opposite directions and defining tape sections therebetween, each of said tape sections having end portions proximate to said creases, and each of said end portions having a permanently set nonplanar cylindrical configuration.

11. The tape of claim 10, wherein each of said tape sections is identically shaped and said tape sections are alternately inverted.

12. The tape of claim 10, wherein each of said end portions has a circular cylindrical configuration about an axis parallel to a longitudinal axis of said tape.

13. The tape of claim 10 wherein each of said end portions has a cylindrical corrugated configuration about an axis parallel to a longitudinal axis of said tape.

14. The tape of claim 13 wherein each of said tape sections further has a permanently set nonplanar cylindrical configuration about an axis transverse to said longitudinal axis of said tape.

15. The tape of claim 10 wherein a portion of each of said tape sections intermediate said end portions further has a permanently set nonplanar cylindrical configuration about an axis transverse to said longitudinal axis of said tape.

16. For use in conjunction with tape apparatus, an elongated tape having elastic qualities in both longitudinal and transverse directions, said tape comprising a series of connected elongated tape sections each having a pair of end portions, each of said end portions being permanently set to a nonplanar cylindrical configuration about an axis extending in said longitudinal direction.

17. The tape defined in claim 16 wherein each of said elongated tape sections is further permanently set to a nonplanar cylindrical configuration about an axis extending in said transverse direction.

18. For use in conjunction with tape apparatus, an elongated tape having elastic qualities in both longitudinal and transverse directions, said tape comprising a series of connected alternately inverted identically shaped equal length tape sections, each of said sections being permanently set to a nonplanar cylindrical configuration about an axis extending in said longitudinal direction.

19. The tape defined in claim 18 wherein each of said elongated tape sections is further permanently set to a nonplanar cylindrical configuration about an axis extending in said transverse direction.

20. In combination with tape apparatus, a fan-folded tape having limited elastic qualities and adapted to aid in refolding itself, comprising:

a series of connected identically shaped alternately inverted tape sections, each of said sections being permanently set to a nonplanar cylindrical configuration about an axis extending parallel to a longitudinal axis of said tape; and tape unfolding means in said apparatus adapted to apply external forces to said tape to deform said tape sections to thereby set up elastic restoring forces therein whereby said restoring forces act in a direction to help refold said tape to a stack of tape sections when said external forces are removed.

21. The combination defined in claim 20 wherein each of said tape sections is further permanently set to a nonplanar cylindrical configuration about an axis extending perpendicular to said lonugitudinal axis of said tape.

22. In combination with tape apparatus, a fan-folded tape having limited elastic qualities and adapted to aid in refolding itself comprising:

an elongated tape including a plurality of equally spaced transverse creases alternately extending in opposite directions and defining tape sections therebetween, each of said tape sections being permanently set to an identical nonplanar cylindrical configuration about an axis extending parallel to a longitudinal axis of said tape, said sections being alternately inverted;

spaced support means in said apparatus for supporting a stack of superposed tape sections thereon; and tape transport means for successively pulling tape sections from said stack between said spaced support means and for returning said pulled tape sections to said stack;

said tape transport means including means for applying external forces to said tape sufficient to unfold and deform said tape to a planar shape so as to exceed the yield strain of said tape with respect to the creases set therein, but so as not to exceed the yield strain of said tape with respect to the nonplanar cylindrical shape set therein, whereby said tape will tend to reassume said nonplanar shape upon the removal of said applied forces and will thereby tend to refold about said creases.

23. In combination with tape apparatus, a fan-folded tape having limited elastic qualities and adapted to aid in refolding itself comprising:

an elongated tape including a plurality of equally spaced transverse creases alternately extending in opposite directions and defining tape sections therebetween, each of said tape sections being permanently set to nonplanar compound cylindrical configurations about an axis extending parallel to a longitudinal axis of said tape and about an axis perpendicular to the longitudinal axis of said tape, said tape sections being alternately inverted;

spaced support means in said apparatus for supporting a stack of superposed tape sections thereon; and tape transport means for successively pulling tape sections from said stack between said spaced support means and for returning said pulled tape sections to said stack;

said tape transport means including means for applying external forces to said tape sufficent to unfold said tape to a planar surface thereby exceeding the yield strain of said tape with respect to the creases set therein but not exceeding the yield strain of said tape with respect to the nonplanar cylindrical configuration set therein, whereby said tape tends to reassume a shape corresponding to said nonplanar cylindrical configuration upon the removal of said applied forces and will thereby tend to refold about said creases and reform said stack of alternately inverted tape sections.

References Cited by the Examiner

UNITED STATES PATENTS

| | | | |
|---|---|---|---|
| 1,089,835 | 3/1914 | Gregory | 274—43 |
| 2,195,096 | 3/1940 | Sackner et al. | 61—10 X |
| 2,651,588 | 9/1953 | Bruce et al. | 161—147 |
| 2,785,728 | 3/1957 | Slayter et al. | 161—99 X |
| 2,865,639 | 12/1958 | Gillette et al. | 226—118 X |
| 3,123,269 | 3/1964 | Morley et al. | 226—195 X |
| 3,223,423 | 12/1965 | Boyden | 226—118 X |

M. HENSON WOOD, Jr., *Primary Examiner.*

J. N. ERLICH, *Assistant Examiner.*